FREQUENCY-DISPERSIVE ELECTRO-MECHANICAL DELAY CELL UTILIZING GRATING

Filed July 15, 1963 2 Sheets-Sheet 1

INVENTOR
Wilfrid Sinden Mortley
BY
Baldwin & Wight
ATTORNEY.

INVENTOR
Wilfrid Sinden Mortley
BY
Baldwin & Wight
ATTORNEYS

United States Patent Office 3,300,739
Patented Jan. 24, 1967

3,300,739

FREQUENCY-DISPERSIVE ELECTRO-MECHANICAL DELAY CELL UTILIZING GRATING

Wilfrid Sinden Mortley, Great Baddow, England, assignor to The Marconi Company Limited, a British company Filed July 15, 1963, Ser. No. 295,099
Claims priority, application Great Britain, Aug. 3, 1962, 29,851/62
8 Claims. (Cl. 333—30)

This invention relates to delay cells, that is to say, to devices in which waves—usually, though not necessarily, supersonic waves—are propagated in order to delay them.

The invention has for its object to provide improved delay cells which will produce results analogous to those produced, for electrical waves, by a dispersive electrical delay line. Different input frequencies fed into a dispersive electrical delay line are differently delayed by amounts dependent on those frequencies so that such a line can be used to produce from a relatively long input signal which sweeps in frequency between two limiting values of frequency, a much shorter output pulse in which all the input frequencies appear. As will be seen later a delay cell in accordance with this invention can be used to produce an analogous result and for this reason, and for the sake of brevity, a delay cell in accordance with this invention will be hereinafter referred to as a dispersive delay cell.

There are many purposes, for example in certain radar systems and for certain spectrometers, in which it is required to convert a relatively long train of signals which sweep in frequency in predetermined manner (for example linearly) between two limiting values of frequency into a shorter pulse containing all the frequencies. Other cases arise in which it is required, oppositely, to convert a short pulse containing a range of adjacent frequencies into a longer train of swept frequencies. There are various known ways of satisfying such requirements the most usual way, at the present time, being by means of a dispersive electrical delay line composed of lumped circuit elements. Such electrical delay lines are expensive, difficult to design to operate satisfactorily mainly because of inevitable losses in the coils in the lumped circuits and because of the large number of reactive elements employed in such lines with the consequent difficulty in avoiding the generation of false pulses due to periodic error in the line. Another known expedient which has been proposed is that of using an ultra-sonic wire line constructed to behave like a waveguide near its cut-off frequency. This expedient is, however, of limited application to relatively low frequencies because such wire lines cannot be made thin enough and of low enough attenuation to be useful at the higher frequencies which generally have to be dealt with. Moreover, the relation with frequency of the dispersion given by such lines is undesirably non-linear. The present invention seeks to avoid the defects of the known proposals above mentioned.

According to this invention a dispersive delay cell comprises a body of wave propagating medium, input signal operated means for propagating waves of different frequencies within a predetermined range of frequencies in said body, signal output means responsive to waves propagated through said body thereto, and at least one graded grating having different parts adapted to select different frequencies for propagation to the output means, said grating or gratings being so positioned and of graded spacings so chosen as to subject waves of different frequencies reaching the output means to different delays dependent on frequency, whereby a predetermined train of swept frequencies if applied to said input means will produce a relatively short pulse of said frequencies at said output means or if said short pulse is applied to said input means will produce said train at said output means.

The input and output means may be transducers separate from said body in which case the grating or gratings may be wave reflecting or wave transmitting and is or are arranged across the wave paths between input and output transducers.

Undesired wave energy may be arranged to be dissipated in the body itself and/or by wave energy absorption means positioned to receive waves to be dissipated and located on surfaces not occupied by input and output means.

The wave propagating medium may be a solid, liquid or even gas, depending upon design requirements, but is perferably solid.

Where the input and output means are constituted by transducers, they are prefably of the required extended length. However, a series of elemental transducers covering the required length may be used.

Where the input and output means are constituted by separate transducers, the body is merely a wave propagating body. A convenient and preferred type of embodiment of this nature employs piezo-electric transducers in association with a wave propagating body of fused quartz, though it is possible to use transducers of other kinds, e.g. magneto strictive transducers. It is, however, possible to carry out the invention making the body of a material such that will not only serve as the wave propagating body but also take part in the conversion of electrical signals into propagated waves and vice versa and the input and output means may consist of electrode systems so constructed as themselves to constitute graded gratings. In one embodiment of this nature, the body material is of piezo-electric crystal and the input and output means are constituted by electrode systems situated on the external faces thereof and each constituted by a pair of comb-like electrodes with interleaved teeth of graded spacing.

Where separate transducers are employed as the input and output means there is some advantage in making them of tapered design with such taper of design that the point of greatest amplitude travels along them as the frequency sweeps whereby strongest "illumination" by wave energy of only that part of the grating which (for the moment) is operative to send wave energy to the output means is obtained. In the case of a piezo-electric transducer the thickness of the transducer can be varied in taper fashion along the transducer from end to end thereof.

The width and/or depth of the grating lines may also be graded so as to be wider and/or deeper where the spacing is greater and narrower and/or shallower where the spacing is less.

As already implied, all the required dispersion may be provided by a single grating or a number of gratings, situated at different places across the desired wave energy paths, may be provided to share the total required dispersion between them. The embodiment of FIGURES 8 to 10 to be described later herein provides one example of this. Although flat gratings, i.e. gratings which lie more or less in a plane, are convenient and preferred and all the embodiments later illustrated herein employ flat gratings, this is not a necessary limitation and gratings lying in curved surfaces may be used.

The invention is illustrated in the accompanying drawings which show in simplified schematic manner a number of embodiments, in which.

Figure 1:
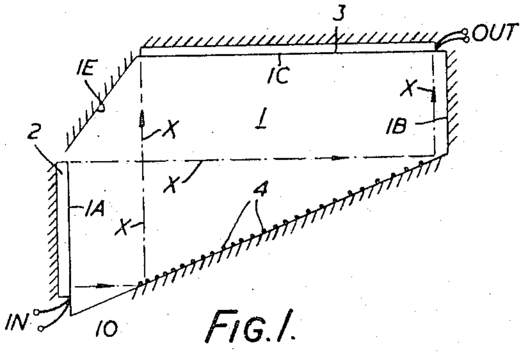
FIGURE 1 is a plan view of one illustrative embodiment of the invention.
Figure 2:
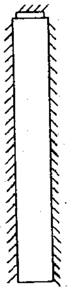
FIGURE 2 is a side view of the embodiment shown in FIGURE 1.
Figure 3:
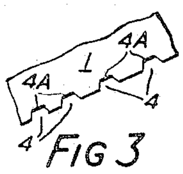
FIGURE 3 is an enlarged detail drawing of the grating for the embodiment shown in FIGURE 1.

Referring to FIGURES 1 to 3, a slab-like body 1 of suitable wave propagating material, for example fused quartz has two parallel faces 1A, 1B, a third face 1C at right angles thereto, an oblique face 1D between faces 1A and 1B and an oblique face 1E between faces 1A and 1C. On the face 1A is a piezo-electric transducer 2 and on the face 1C is another piezo-electric transducer 3. The embodiment now being described is, like other embodiments of this invention, reversible and accordingly either of these transducers may be used for the input and the other for the output. However in the figure, it is assumed that it is the transducer 2 which is used for the input and the transducer lead terminals are marked "in" and "out" in accordance with this assumption. On the inclined face 1D is formed by any suitable known method—for example a method akin to those used for the manufacture of optical line gratings—a graded reflecting line grating 4, the adjacent line spacing of which is graded, i.e. varied, preferably linearly, from one end of the grating to the other. The lines of the grating run perpendicularly to the plane of the paper in FIGURE 1. It is virtually impossible to show such a fine grating with even approximate accuracy in a drawing such as that of FIGURE 1 and accordingly the lines of the grating are represented in that figure by dots. A suitable form for the grating will, however, be appreciated from FIGURE 3 (though that figure is equally diagrammatic) which represents a few of the lines represented by dots in FIGURE 1. In the form illustrated in FIG. 3 the backs 4A of the lines cut in the material of the body are flattened and inclined. Behind the grating, i.e. on the side thereof remote from the body, is a layer of suitable wave absorbing material, e.g. solder, and wave absorbing material is also provided on the backs of the transducers and on the outside of the faces 1B and 1E. In FIGURES 1 and 2 such wave absorbing material is conventionally represented by shading.

If a predetermined swept train of frequencies—preferably, though not necessarily a linearly swept train of frequencies—is applied to the transducer 2, waves of all frequencies in the swept train will be incident on the whole length of the graded grating. The geometry and dimensions of the body 1 are, however, such and the varied spacings of adjacent reflector lines in the grating are so chosen that each different part of the grating will selectively reflect in the direction of the transducer 3 a different frequency within the swept range so that the path lengths for waves of different frequencies from one transducer via the grating to the other is different, i.e. the waves are differently delayed, the delays being such that the cell operates analogously to a dispersive delay line translating a specified relatively long swept train of frequencies applied to transducer 2 into a short output pulse of frequencies from transducer 3 and, oppositely, such a short pulse applied to 2 will produce such a swept train at 3.

The principles underlying the operation of the dispersive delay cell such as that shown in FIGURE 1, and the considerations enabling such a cell to be designed to operate as a dispersive cell in specified conditions will now be explained and described. Since the cell is reversible it is possible to consider its behaviour whether there is a short pulse input or a long swept train input but the former case is somewhat the easier one to choose for purposes of explanation and is accordingly chosen.

Consider a short "plane" pulse propagated perpendicularly against a uniformly spaced array of line reflectors, e.g. perpendicularly against a reflecting grating with uniform line spacing. A "plane" pulse is an advancing plane surface of elastic distortion in the medium. When this plane pulse strikes all of the line reflectors simultaneously, reflectors will send out circular ripples which will propagate to right and to left, along the grating, as a long pulse of constant frequency with wavelength equal to the unit spacing of the array. With such a grating the effect is not reversible for there is no dispersion. If a wave group of the same constant frequency were projected endwise along the grating the result would not be a short plane pulse, but rather a triangular envelope containing the same constant frequency. The properties of triangular wave envelopes are well known in the prior art, but these properties are not noted herein because the purpose of this particular example is to illustrate that a uniformly spaced array of line reflectors is not reversible with respect to its reaction to a plane pulse.

Consider now the case of a graded grating which has an increasing line spacing along its length. A pulse projecting against this, normal to it, will generate a rising frequency propagated along it in one direction and a falling frequency in the other direction, the duration of the signal, as before, depending upon the time of wave travel along the length of the grating in the particular medium which is being used.

Consider now what happens if we project a wave normally against a grating with a spacing not equal to a wavelength. If the wavelength is less than the spacing, the wavefronts will co-operate (and so produce a beam) at an angle $\theta$ to the normal given by $$\theta = \pm \sin^{-1} \lambda/d \qquad (1)$$

where $\lambda$ is the wavelength and, of course, less than $d$, the spacing.

There will always, of course, be a wave reflected at an angle equal to the angle of incidence; in the case now being considered, directly back to the wave source. This, however, is not of immediate interest.

If, therefore, a swept train of frequencies is projected normally against a graded grating a beam will be sent in a particular direction, $\theta$, only from that part of the grating at which $\sin \theta = \lambda/d$. As the frequency sweeps, the location at which the beam is reflected at a given angle, $\theta$, progresses along the grating. If the frequency is swept in the right direction and at the right rate, a short pulse of waves will build up as the active part of the grating (for that value of $\theta$) travels along at the wave propagation velocity.

It may be shown that the spacing required for a given angle of incidence, $\theta$, and angle of reflection $\phi$ (or vice versa) is given by the expression $$\lambda/d = \sin \theta - \sin \phi \qquad (2)$$

and the duration T of the swept frequency pulse is given by $$T = (l/c)(\sin \theta - \sin \phi) \qquad (3)$$

where $l$ is the length of the grating (measured across the grating lines) and $c$ is the wave velocity in the medium.

There are obviously an infinite number of choices for $\lambda/d$. Suppose we choose arbitrarily $\lambda/d = 0.5$.

Since the beams are normal to one another, $$(\theta + \phi) = \pi/2$$

and it can be shown that $\theta_{0.5} = \cos^{-1}$ $$(\lambda/d\sqrt{2})-\eta/4=24^\circ\ 18' \qquad (4)$$

and $$T_{24^\circ 15'}=1/2c \qquad (5)$$

For design purposes it is convenient to write $$l_{24^\circ 18'}=2ct \qquad (6)$$

and $$d_{24^\circ 18'}=2\lambda=2c/f \qquad (7)$$

Now consider a construction as shown in FIGURE 1 and suppose the frequency is to be $f_1$ to $f_2$ in Time T. The spacing $d$ must be equal to twice the wavelength $\lambda=c/f$, at proportionate distances $s$ from one end of the grating. It may be shown that $$d=(d/\lambda)c/((s/l)(f_2-f_1)+f_1) \qquad (8)$$

or, with $\lambda/d=0.5$ $$d_{24^\circ 18'}=(2c/(f_2-f_1))/[(f_1/(f_2-f_1))+(s/2cT)] \qquad (9)$$

The positions of the individual lines may be computed, one at a time, starting from $s=0$. Let the solutions be called $d_0$, $d_1$, $d_2$ . . . $d_n$ at positions $s_0$, $s_1$, $s_2$ . . . $s_n$ where $$s_n=\sum_{o}^{n-l_d} \qquad (10)$$

If the frequency is to sweep upwards, the "start" of the grating, $s=o$, should be nearest to the transducer and vice versa.

The precision of determination of the varying grating spacings $d$ must clearly be high and precision of the order of that used in optical gratings is required. The depth of the lines of the grating and/or the widths thereof can with advantage be made greater at the end with greatest spacing diminishing towards the other end.

It will now be clear that, at any given instant only a small part of the grating will be reflecting a signal from one transducer to the other, the particular part depending upon the particular frequency component being reflected thereby. Nevertheless, the whole grating is "iluminated" and will be reflecting signals into various other directions. These signals are unwanted and must be dissipated as much as possible before they can arrive by some multiple reflection path at the receiving transducer. Dissipation may be partly or wholly in the medium especially if the paths of the unwanted signals are much longer than the paths of the wanted signal. The ratios of the former path lengths to the latter path lengths can be increased by using large distances between transducers and grating. Dissipation can also be effected by coating surfaces not used for transducers or reflectors with lossy material such as solder, and this expedient is illustrated in FIGURES 1 and 2.

It is also of advantage to "illuminate" the grating strongly only at the part which is at the moment reflecting the useful signal. This may be achieved to some extent by using transducers of tapered thickness so that the point of greatest amplitude travels along each transducer from one end to the other as the frequency sweeps. This expedient may be adopted similarly for both transducers because both handle the identical frequency spectrum spread out along their lengths. The only difference is the times at which these components are present. The transducers should be of high Q subject, of course, to their being able to accommodate in bandwidth all the frequency components of the envelope of the long pulse so that the amplitude is able to build up and die away sufficiently rapidly.

It will be observed that, in FIGURE 1, the wave energy absorbing materials includes such material provided for absorbing unwanted reflections and also (that on the backs of the transducers) for loading the transducers and thus increasing bandwidth.

Figure 4:
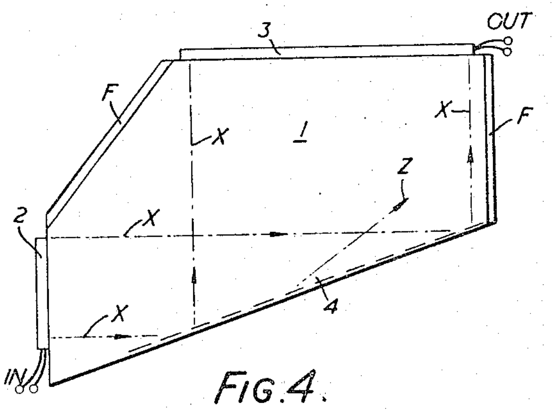
FIGURE 4 is a plan view of a modified form of the embodiment shown in FIGURE 1.

As already explained there will be unwanted wave energy reflected from the grating. Probably much the greater part of this unwanted reflection will be specular reflection in directions at an angle to that of the wanted reflected energy towards the output transducer. It is of advantage, therefore, to provide the body 1 with at least one inclined facet—inclined for example at 30°—positioned to receive specularly reflected energy and to reflect it back into the body in such manner as to cause it to zig-zag back and forth between the side faces of said body (the faces which are in planes parallel to the paper in FIGURES 1 and 4) a considerable number of times, these faces being coated with wave absorbing material to dissipate the energy in question. FIGURE 4 shows a modification of the embodiment of FIGURE 1 in which this is done. As will be seen FIGURE 4 differs from FIGURE 1 by the provision of the two similar facets F and by the fact that the body 1 is made larger than in FIGURE 1 in such manner as to make the facets F long enough to receive at least the bulk of the specularly reflected energy. A typical specularly reflected energy path is indicated in FIGURE 4 by the arrow-headed chain line Z, the main "beams" of desired energy being represented, as in FIGURE 1, by the chain lines X. In order to simplify FIGURE 4, energy absorbing material is not shown and the grating 4 is represented simply by a broken line.

Figure 5:
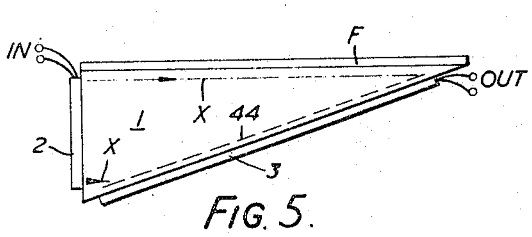
FIGURE 5 is a plan view of a second embodiment of the invention.
Figure 6:
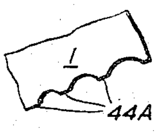
FIGURE 6 is an enlarged detail drawing of the grating for the embodiment shown in FIGURE 5.

FIGURE 5 shows a modification in which a transmitting line grating 44 is used in place of the reflecting line grating 4 of the previously described embodiment and, of course, the output transducer 3 is positioned behind the grating to receive the desired wave energy selectively passed by the grating. In FIGURE 5 the shape of the body 1 is that of a triangular slab. A convenient form for the grating 44 is shown in FIGURE 6 in the manner adopted in FIGURE 3. The desired energy passes the flat surfaces 44A. An inclined facet F, serving the same purpose as in FIGURE 4, is shown and again the grating is represented simply by a broken line and energy absorbing material, which may be provided as desired, is not shown.

Figure 7:
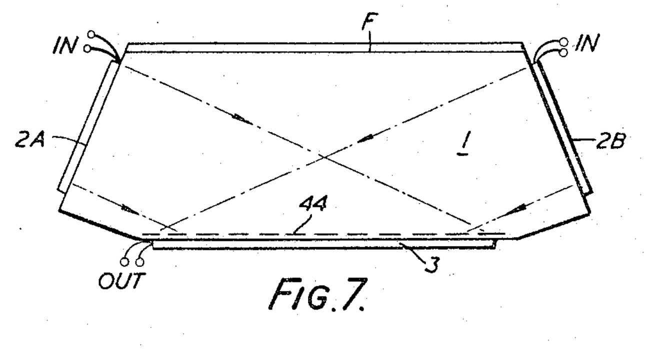
FIGURE 7 is a plan view of the third embodiment of the invention.

FIGURE 7 shows a development of the embodiment of FIGURE 5 wherein there are three transducers 2A, 2B and 3. If a predetermined swept wave train is applied as input to transducer 2A a short output pulse will appear at transducer 3 and if a swept wave train with an opposite direction of sweep, but otherwise similar, is applied to transducer 2B a similar short pulse will appear at 3. The two transducers 2A, 2B therefore permit the cell to handle wave trains of opposite directions of sweep. Again if predetermined swept trains, alike except that the directions of sweeping are opposite, are applied to transducer 3, one will produce a short output pulse at 2A and the other will produce a short output pulse at 2B. Thus the cell may be used to separate oppositely swept but otherwise similar swept wave trains. Other uses of the cell are possible. Obviously the expedient of duplicating one of the transducers, in the manner of FIGURE 7 is not limited to cases in which transmitting line gratings are employed, but is equally applicable to cases in which reflecting line gratings are used.

Figures 8, 9:
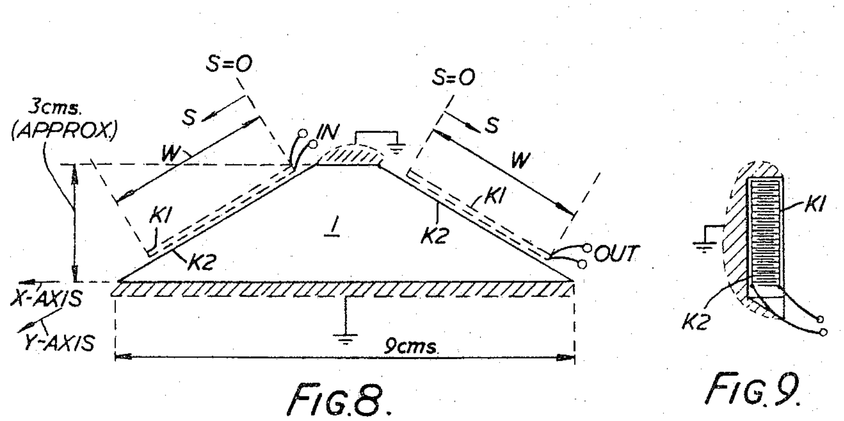
FIGURE 8 is a plan view of a fourth embodiment of the invention.
FIGURE 9 is a side view of the embodiment of FIGURE 8 showing the grating structure used therein.
Figure 10:
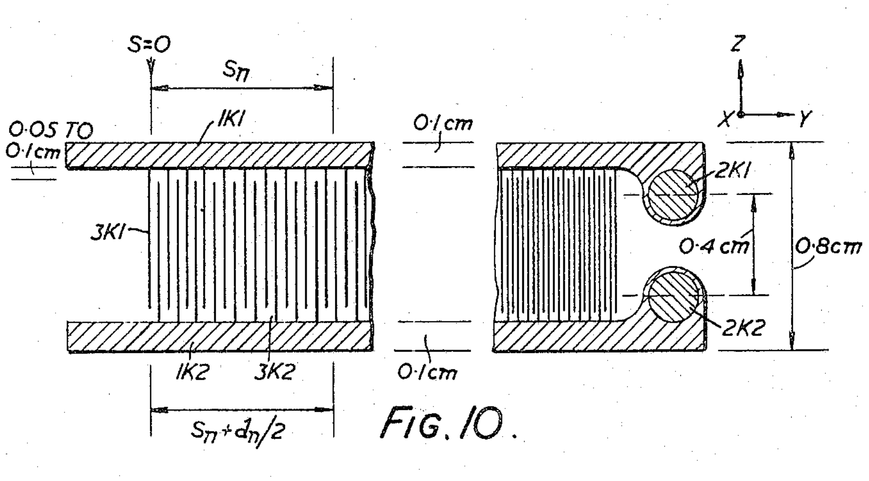
FIGURE 10 is an enlarged plan view of the grating structure shown in FIGURE 9.

It is not necessary that the transducers shall be separate devices and the body serve for wave propagation only. The body may, for example, be made of piezo-electric material such as piezo-electric quartz or barium titanate and used also to take part in the transformation of electrical signals into waves to be propagated, and vice versa. Piezo-electric quartz may be used if the maximum delay does not exceed about 10$\mu$ sec. It is possible to generate waves in piezo-electric material without employing separate transducers by using inter-leaved metal comb-like electrodes on the appropriate surfaces of the material, e.g. deposited thereon in the form of metal film. Piezo-electrical material such as crystal quartz has trigonal symmetry about the principle (or $z$) axis, with three "electric" (or $x$) axes angularly bisecting three "mechanical" (or Y) axes. An electric field directed along an X axis causes contraction or expansion along that axis (the piezo-electric effect). An electric field directed along a Y axis produces a shear distortion by lengthening one X axis and shortening another. FIGURES 8, 9 and 10 illustrate a cell in which the chosen direction of propagation is along the X-axis and the electrodes, which lie on two parallel faces to the Y axis are also so dimensioned as to produce the effects produced by the separate gratings employed in the previously described embodiments. FIGURES 8 and 9 are diagrammatic mutually perpendicular views of the cell and FIGURE 10 is a view to a much larger scale showing one of the two pairs of interleaved comb-like electrodes employed. As will be apparent later, the embodiment of FIGURES 8, 9 and 10 has two gratings, each constituted by an electrode system, and each providing half the total dispersion.

Referring to FIGURES 8 and 9 the body 1 is of piezoelectric quartz and has two pairs of comb-like electrodes on its inclined faces, one pair on each of said faces. In FIGURES 8 and 9 earthed wave absorbing metal is represented by shading and in FIGURE 8 each pair of comb-like electrodes K1, K2 is represented by two parallel, close, broken lines spaced from the adjacent body surfaces, though in fact they are deposited thereon. The X and Y axes are indicated in FIGURE 8 by arrows so referenced. In arrangements of this nature in which gratings are, in effect, constituted by interleaved comb-like electrodes the equivalent $d$ to the quantity $d$ hereinbefore mentioned is the spacing between two adjacent "teeth" of the same "comb." It may be shown that, for a linear frequency sweep, $d$ is given by the equation:

$$d=\frac{\frac{1}{2}c^2T\ \text{cosec}^2\ \theta}{(f_2-f_1)\left(s+\left(\frac{1}{2}cT\ \text{cosec}\ \theta\right)\left(\frac{f_1}{f_2-f_1}\right)\right)} \quad (11)$$

The number $m$ of pairs (one in each comb) of teeth required is given by:

$$m=(T(f_2+f_1)) \quad (12)$$

which, being of the form $$d=\frac{a}{s+b}$$

where $a$ and $b$ are system constants derivable from Equation 11 is convenient for digital computation.

Adding suffices we get:

$$d_n=\frac{a}{(s_n+b)} \quad (13)$$

and $$S_n=S_{n-1}+d_n \quad (14)$$

Electrode teeth of one polarity, i.e. in one comb of a pair are located at positions $s_n$ and those of the interleaving comb are placed at positions $$S_n+\frac{d_n}{2}$$

One pair of combs is more fully shown in FIGURE 10. The "backs" of the combs are referenced 1K1, 1K2 and connections are made thereto by means of fired on silver spots 2K1, 2K2 on the quartz. The comb teeth are referenced 3K1, 3K2 and, as will be seen, the spacing is graded, being a maximum at the left hand end in FIGURE 10 and a minimum at the right hand end. The combs (backs and teeth) are of deposited gold and may be, to quote a practical example, from 0.1 to 0.2$\mu$ thick. The teeth may be from 30 to 40 $\mu$ wide and are positioned in accordance with the preceding explanation. Other practical dimensions are shown in FIGURE 10 and also in FIGURE 8. These dimensions were adopted for a design in which $c$ was $5.72\times10^5$ cms./sec.: T was 10$\mu$ sec.; $f_1$ was 60 mc./s.; $f_2$ was 45 mc./s.; and the sweep was substantially linear. The time delay between the end of the 10$\mu$ sec. input pulse and the centre of the short pulse produced by a sweep was 3.5$\mu$ sec. The length of the short pulse depends upon the amplitude shaping of the input pulse. For a rectangular input pulse the output pulse is of sin $x/x$ form with a width at the half-power points of $$\frac{1}{f_1-f_2}=0.06\mu\ \text{sec.}$$

in the present case. With an input pulse with an amplitude distribution of typical Gaussian approximation the short output pulse is a similar amplitude distribution and the pulse width is increased to about 0.11 or 0.12$\mu$ sec. Thus, in this case, the "compression factor" is between 80 and 90. The length W of each electrode system was 3.3 cms. These figures are, of course, given by way of example only.

It is preferred, though not essential, that in all embodiments for carrying out the invention the fundamental frequency should be greater than the sweep frequency, so that not more than one part of a transducer is radiating a beam at any time.

Fundamentally the wave mode employed when practising the invention may be longitudinal or transverse but the latter can be used only in solid media and provide the greatest delay for a given path length. It is also possible to maintain this mode without transformation to the other mode, thus avoiding a source of signal loss. For these reasons transverse waves are generally chosen in normal known solid medium delay cells, but these reasons do not apply in the same way to the present invention and transverse waves will not always be the better. Indeed, longitudinal waves may be preferred in some cases in which the geometry is such as not to lead to difficulties due to translation of longitudinal waves into transverse waves. Generally the longitudinal mode will be preferred in carrying out the invention because it will result in a larger grating which is easier to make. For very long input trains, however, the transverse mode may be preferred because it results in a smaller and therefore cheaper cell.

The invention is obviously not limited to the use of wave propagating bodies of the shapes shown in the drawings or to the use of flat gratings. In all cases the total required dispersion may be divided among a number of gratings in the desired wave propagation path from input to output each reflecting or transmitting the desired wave energy to the next (if any). The choice of the angle of a grating is at large as will be well understood from the mathematical description given hereinbefore. For example, with a flat grating at an angle of 45° it may be shown that:

$$d=\sqrt{2}\lambda=\frac{c\sqrt{2}}{s_1(f_2-f_1)+f_1} \quad (15)$$

In place of a long transducer extending over the appropriate surface of the wave propagating body a number of elemental transducers operating together and in close juxtaposition next to one another may be employed to cover the same length. In such a case the transducer elements are preferably parallelogram shaped so that the lines at which each adjoins the next are not at right angles to the direction of the length over which the series of transducer elements extends, but at an oblique angle to that direction.

Although for convenience and simplicity of description reference has been made hereinbefore to the short pulse produced by a train of swept frequencies, it will be understood that in practice, if the swept train envelope is fairly square ended, there will be a short main pulse of time duration (measured between the half-power points) equal to the reciprocal of the frequency range covered by the frequency sweep, this main pulse and minor pulses being usually in about the same relationship as the main lobe and side lobes in the polar diagram of a radio directional aerial with uniform distribution of amplitude across the radiating "aperture." If, however, the train envelope has sloping ends approximately corresponding to a Gaussian distribution, the minor pulses will be very much reduced but at the expense of increasing the width of the main pulse by about 60% to 70%.

I claim:

1. A dispersive delay device comprising a body of wave propagating material, input signal means coupled to said body for propagating waves of different frequencies within a predetermined range of frequencies in said body, signal output means coupled to said body and responsive to waves propagated through said body thereto, and at least one graded line grating having different parts adapted to select different frequencies for propagation to the output means, said line grating being so positioned and the graded spacings between the lines thereof being so chosen as to delay waves of different frequencies by different amounts dependent on frequency, whereby a predetermined train of swept frequencies applied to said input means will produce a relatively short pulse of said frequencies at said output means and a short pulse applied to said input means will produce said train of swept frequencies at said output means.

2. A device as claimed in claim 1 wherein the input and output means are separate from said body and the gratings are wave reflecting and are arranged across the wave paths between input and output transducers.

3. A device as claimed in claim 2 and also including absorption means positioned to receive waves to be dissipated and located on surfaces not occupied by said input and output means.

4. A device as claimed in claim 2 and comprising piezo-electric transducers in association with a wave propagating body of fused quartz.

5. A device as claimed in claim 2 wherein piezo-electric transducer means are employed and the thickness of the transducer is varied in taper fashion along the transducer from end to end thereof.

6. A dispersive delay device comprising a body of piezo-electric material, an input electrode coupled to one external face of said crystal to induce waves of different frequencies within a predetermined range of frequencies in said crystal in response to electrical input signals applied to said input electrode, an output electrode coupled to another external face of said crystal to pick up electrical signals induced in said crystal by said waves, said input and output electrodes each comprising a graded line grating, and said input and output electrodes being so positioned and the spacing between the lines thereof being so graduated as to delay waves of different frequencies by different amounts dependent on frequency, whereby a predetermined train of swept frequencies applied to said input electrode will produce a relatively short pulse of said frequencies said output electrode and a short pulse applied to said input electrode will produce a train of swept frequencies at said output electrode.

7. A dispersive delay device comprising a body of piezo-electric crystal, a pair of comb-like input electrodes with interleaved teeth coupled to one external face of said crystal to induce waves of different frequencies within a predetermined range of frequencies in said crystal in response to electrical input signals applied to said input electrodes, a pair of comb-like output electrodes with interleaved teeth coupled to another external face of said crystal to pick up electrical signals induced in said crystal by said waves, said input and output electrodes being so positioned and the spacing of the interleaved teeth thereof being so graduated as to delay waves of different frequencies by different amounts dependent on frequency, whereby a predetermined train of swept frequencies applied to said input electrodes will produce a relatively short pulse of said frequencies at said output electrodes and a short pulse applied to said input electrodes will produce a train of swept frequencies at said output electrodes.

8. A dispersive delay device comprising a body of wave propagating material, input signal means coupled to said body for propagating waves of different frequencies within a predetermined range of frequencies in said body, signal output means coupled to said body and responsive to waves propagated through said body thereto, and at least one graded line grating having different parts adapted to select different frequencies for propagation to the output means, said grating being so positioned and the graded spacing between the lines thereof being so chosen as to delay waves of different frequencies by different amounts dependent on frequency, and the width of the grating lines being graded so that the width is greater where the spacing is greater and less where the spacing is less, whereby a predetermined train of swept frequencies applied to said input means will produce a relatively short pulse of said frequencies at said output means and a short pulse applied to said input means will produce a train of swept frequencies at said output means.

References Cited by the Examiner

UNITED STATES PATENTS

| | | | |
|---|---|---|---|
| 2,169,304 | 5/1939 | Tournier | 333—72 |
| 2,416,338 | 2/1947 | Mason | 333—30 |
| 2,643,286 | 6/1953 | Hurvitz | 333—30 |
| 2,965,851 | 12/1960 | May | 333—30 |
| 3,041,556 | 6/1962 | Meitzler | 333—30 |
| 3,070,761 | 12/1962 | Rankin | 333—30 |
| 3,259,014 | 7/1966 | Johnson et al. | 333—30 |

HERMAN KARL SAALBACH, *Primary Examiner.*

C. BARAFF, *Assistant Examiner.*

Notice of Adverse Decision in Interference

In Interference No. 96,073 involving Patent No. 3,300,739, W. S. Mortley, FREQUENCY - DISPERSIVE ELECTRO - MECHANICAL DELAY CELL UTILIZING GRATING, final judgment adverse to the patentee was rendered Sept. 17, 1968, as to claims 1, 2, 3, 4 and 8.

[*Official Gazette October 29, 1968.*]

Disclaimer 3,300,739.—*Wilfrid Sinden Mortley*, Great Baddow, England. FREQUENCY-DISPERSIVE ELECTRO-MECHANICAL DELAY CELL UTILIZING GRATING. Patent dated Jan. 24, 1967. Disclaimer filed Dec. 5, 1968, by the assignee, *The Marconi Company Limited*.

Hereby enters this disclaimer to claims 1, 2, 3, 4 and 8 of said patent.

[*Official Gazette January 21, 1969.*]